Figure 1:
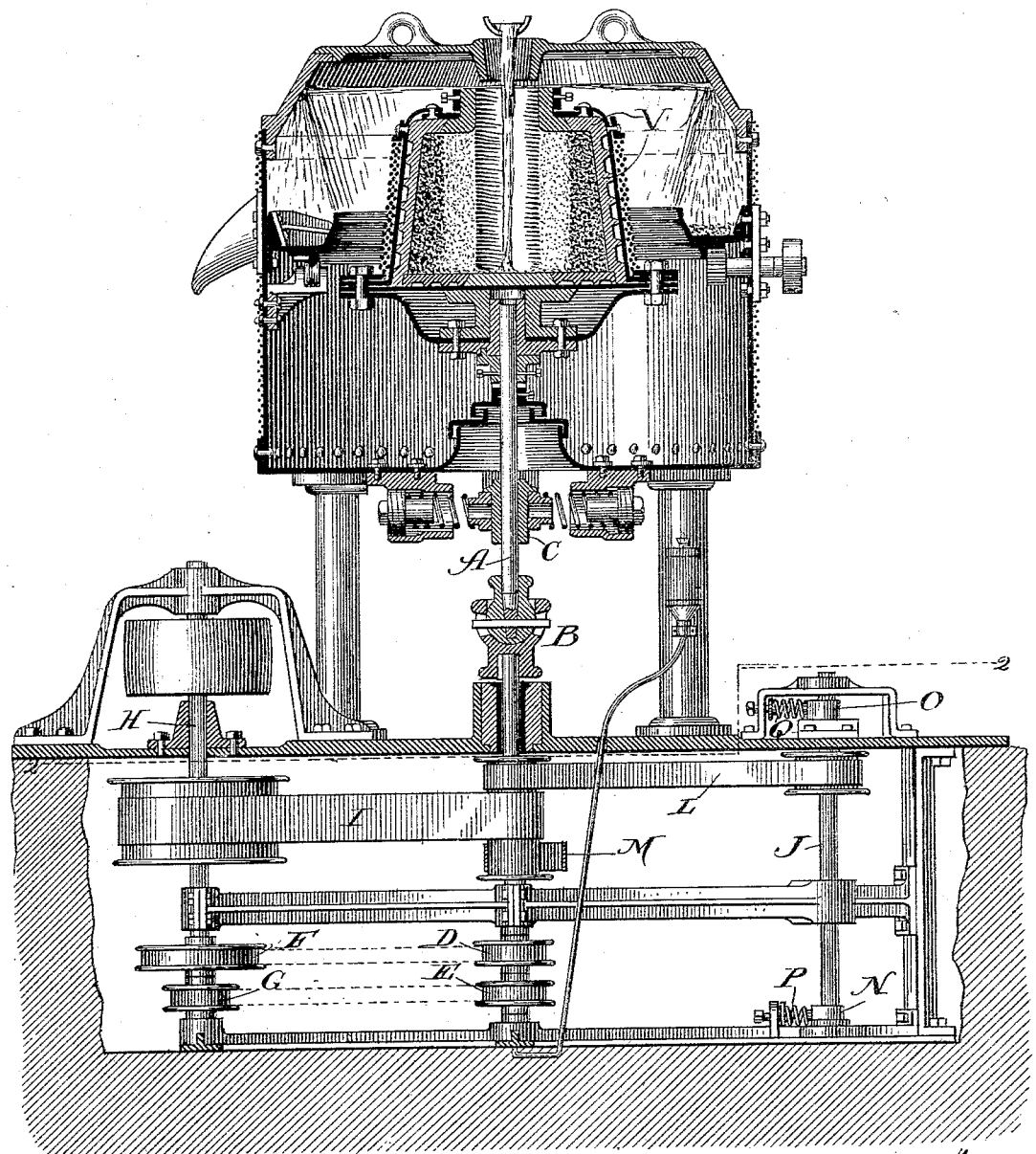

(No Model.) 2 Sheets—Sheet 1.

P. H. ADAMS, Jr. & O. T. X. ADAMS.
APPARATUS FOR USE IN DECOMPOSING METALLIC SALTS AND DESULPHURIZING ORES.

No. 399,119. Patented Mar. 5, 1889.

Witnesses:
Frank Blanchard
Clifford M. White

Inventors.
Phineas H. Adams Jr.,
Orsemas T. X. Adams,
By Banning & Banning & Payson
Attorney.

(No Model.) 2 Sheets—Sheet 2.
P. H. ADAMS, Jr. & O. T. X. ADAMS.
APPARATUS FOR USE IN DECOMPOSING METALLIC SALTS AND DESULPHURIZING ORES.
No. 399,119. Patented Mar. 5, 1889.
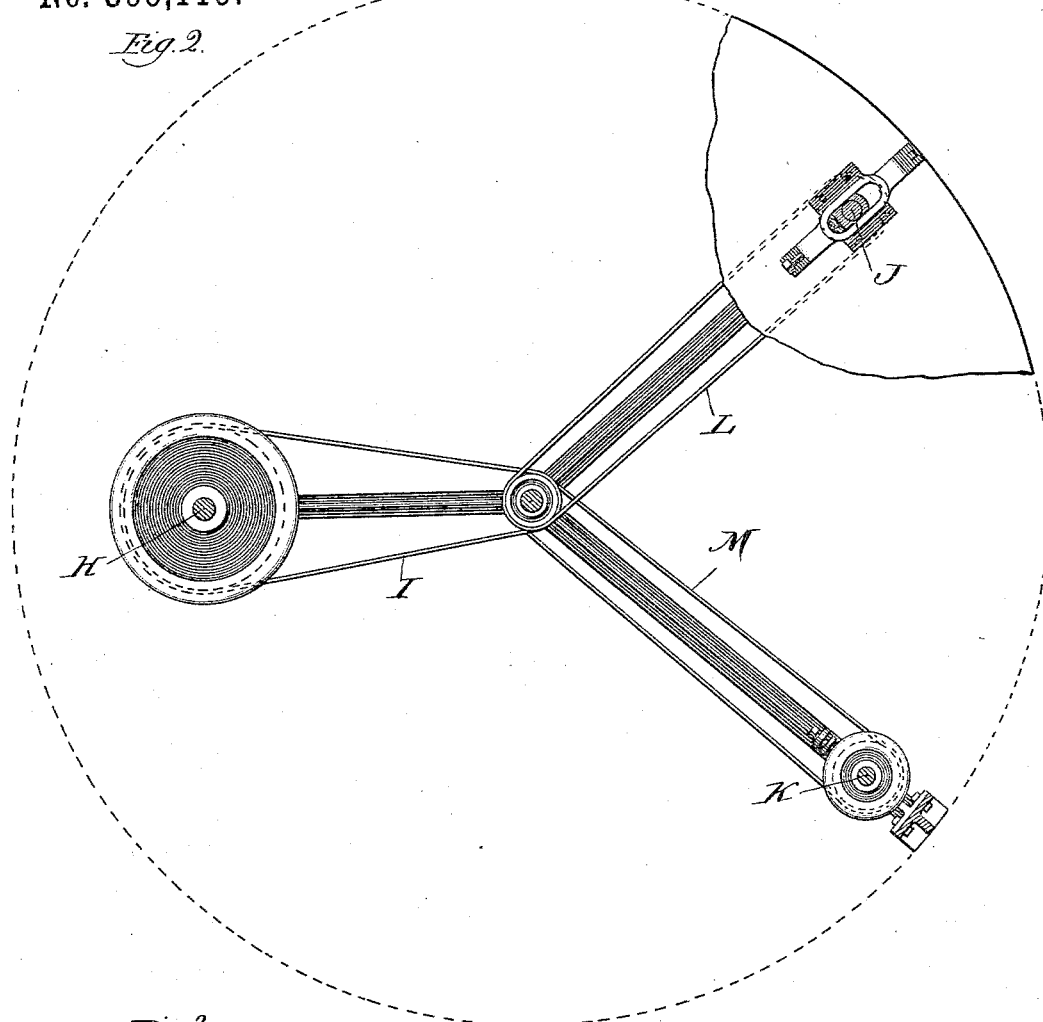
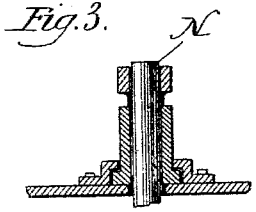
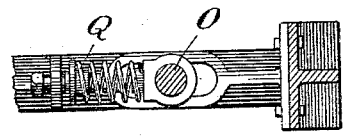
Witnesses:
Clifford N. White.
Fred Gerlach.
Inventors:
Phineas H. Adams Jr.
Orsemas T. X. Adams,
By Banning & Banning & Payson,
Attorneys.

UNITED STATES PATENT OFFICE.

PHINEAS H. ADAMS, JR., AND ORSEMAS T. X. ADAMS, OF CHICAGO, ILLINOIS, ASSIGNORS TO MELINDA PECK, OF SAME PLACE.

APPARATUS FOR USE IN DECOMPOSING METALLIC SALTS AND DESULPHURIZING ORES.

SPECIFICATION forming part of Letters Patent No. 399,119, dated March 5, 1889.

Application filed January 3, 1889. Serial No. 295,365. (No model.)

*To all whom it may concern:*

Be it known that we, PHINEAS H. ADAMS, Jr., and ORSEMAS T. X. ADAMS, citizens of the United States, residing at Chicago, Illinois, have invented certain new and useful Improvements in Apparatus for Use in Decomposing Metallic Salts and Desulphurizing Ores, of which the following is a specification.

The object of our invention is to improve an apparatus for mechanically decomposing chemical compounds, metallic salts, and desulphurizing ores or their resulting material, when the substances treated are in a molten condition, by the action of centrifugal force; and our invention has more particular reference to the running-gear employed in such apparatus.

In the drawings, Figure 1 is a vertical section of the apparatus, showing the lower portion of the running-gear in elevation. Fig. 2 is a plan view of the running-gear, taken in the line 2 2 of Fig. 1. Fig. 3 is a detail of one of the adjustable boxes of the counter-shaft, and Fig. 4 is a detail of the other end.

In making our improved apparatus for decomposing chemical compounds, metallic salts, or salts of metal, and desulphurizing ores, we make a receiving-vessel, V, constructed and adapted to receive the substances to be treated when in a molten condition. This receiving-vessel is mounted and rests upon an actuating-shaft, to which it is fixed or keyed in such a way that by the rotation of the shaft the receiving-vessel will be revolved. The receiving-vessel may be made in such way as will secure the required strength and reduce the conduction of heat from the interior to the exterior. It may be surrounded by a curbing and have a removable bottom to facilitate the removal of the material which is not thrown off at the top by the action of centrifugal force, and in other respects it may be made as will be calculated to subserve the end in view and permit of its being rotated at a high rate of speed for the separation of particles of different degrees of density in the matter treated. Many of these parts and the details of their construction, as they do not form the subject-matter of our present claims, need not be more fully described, as they will be sufficiently understood from an inspection of the drawings.

The actuating-shaft A, which serves to rotate the receiving-vessel, is preferably provided with a flexible joint or coupling, B, to enable its upper portion to have a sufficient lateral play to accommodate it to the vibrations of the receiving-vessel when rotating at a high rate of speed. To assist in maintaining it in its position and restore it to its vertical position as it vibrates from one side to another, a laterally-yieldable journal, C, may be provided, as shown in Fig. 1. The lower portion of the actuating-shaft is rigidly maintained in its vertical position by proper boxing, as shown. As the receiving-vessel is intended to be rotated at a speed of several thousand revolutions a minute, and as the actuating-shaft which rotates it will revolve with equal speed, while at the same time sustaining its weight with the superimposed load, great friction will be produced in the bearing on which it rests, and on which it revolves, unless provision be made to prevent it. To reduce the amount of this friction, or rather to distribute it, we have divided the bearing of the shaft into several parts or sections, located between the lower portion of the shaft or a shoulder or head thereon, so as to sustain its weight, and the stationary bearing sustaining the weight of the whole, each portion of the bearing being separately rotatable in the direction of the shaft and provided with means to rotate it, but at a less rate of speed than the section of bearing immediately above it. To this end we provide a number of sections in the bearing, each provided with a pulley or belt-surface, as D and E, connected by belts to pulleys or belt-surfaces, as F and G, on a power-shaft, H, which is connected with the actuating-shaft by means of a belt, I. The last or lowest section of the bearing, of course, rests in or upon a stationary bed or socket adapted to receive it. All of the sections of the bearing rotating in the same direction as the actuating-shaft, the speed or friction produced in each section of bearing can only be the friction caused by the difference between its rotation and the rotation of the section above it. In this way the friction speed between the shaft and its stationary bearing may be divided as many times as desired, so that the friction speed at any one point will be too small to occasion difficulty or injury. Of course it will be understood that the pulleys or belt-surfaces on the power-shaft are proportioned in size to those on the different sections of the divided bearing to secure the rotation of each section of bearing at the speed desired. As the actuating-shaft will be subjected to a great lateral strain in order to rotate it, caused by the pulling of the belt connecting it with the power-shaft, thus occasioning great lateral friction in the boxes or journals that maintain it in a vertical position unless means be provided to prevent this, we prefer to employ one or more counter-shafts, as J K, connecting them with belts L M to the actuating-shaft and drawing them in a direction opposite to the pulling strain caused by the belt connecting it with the power-shaft. In this way we counterbalance or counteract the pulling strain in one direction, and so reduce or prevent extreme and injurious lateral friction between the power-shaft and its journals. These counter-shafts may be located in any position desired, and may be of any preferred size or arrangement so long as they enable us to connect them by belts or bands to the actuating-shaft, and so overcome the injurious lateral strain above explained.

In order to regulate or adjust the tension or drawing strain exerted on the actuating-shaft by the counter-shafts, we have provided means for moving them toward or away from the actuating-shaft. We prefer to do this by means of movable journals N O, arranged in slots or grooves in the frame-work. In Figs. 3 and 4 we have shown both methods of arrangement. We provide springs P Q between the counter-shafts and the actuating-shaft, as shown in Figs. 1 and 4. These springs may be arranged in any convenient manner, and are intended to exert sufficient pressure on the journals of the counter-shafts to adjust and hold them at that point where the tension of the bands or belts will be proper and sufficient. At the same time they are capable of yielding slightly, so as to permit the counter-shafts to vibrate in unison with the vibrations that may occur in the actuating-shaft or to irregularities on the belt.

What we regard as new, and desire to secure by Letters Patent, is—

1. In an apparatus for decomposing metallic salts or salts of metals and desulphurizing ores when in a molten state, the combination of a revoluble receiving-vessel adapted to receive molten material to be treated, a revoluble actuating-shaft rotating said vessel as it revolves, a bearing for the lower end or portion of the actuating-shaft, a counter-shaft adjustable toward or from the actuating-shaft to regulate the tension of its belt, and with its belt drawing against the actuating-shaft in opposition to the power-shaft to counteract or counterbalance lateral strain, and means for rotating the actuating-shaft and the sections of its bearing, substantially as described.

2. In an apparatus for decomposing metallic salts or salts of metals and desulphurizing ores when in a molten state, the combination of a revoluble receiving-vessel adapted to receive molten material to be treated, a revoluble actuating-shaft rotating said vessel as it revolves, a bearing for the lower end or portion of the actuating-shaft, comprising a number of sections respectively rotatable in the direction of the rotation of the actuating-shaft, a counter-shaft adjustable toward or from the actuating-shaft to regulate the tension of its belt, with yieldable means for adjusting and sustaining it in proper position, and with its belt drawing against the actuating-shaft in opposition to the power-shaft to counteract or counterbalance lateral strain, and means for rotating the actuating-shaft and the sections of its bearing, substantially as described.

PHINEAS H. ADAMS, JR.
ORSEMAS T. X. ADAMS.

Witnesses:
THOMAS A. BANNING,
EPHRAIM BANNING.